June 23, 1959 R. L. DOERRFELD ET AL 2,892,029

LINE FEED DELETE MECHANISM

Filed Dec. 29, 1954

INVENTORS
ROBERT L. DOERRFELD
FRANS H. FRYKSDALE

BY Emery Robinson
ATTORNEY

United States Patent Office 2,892,029

Patented June 23, 1959

2,892,029

LINE FEED DELETE MECHANISM

Robert L. Doerrfeld, Bellwood, and Frans H. Fryksdale, Chicago, Ill., assignors to Teletype Corporation, Chicago, Ill., a corporation of Delaware Application December 29, 1954, Serial No. 478,370

7 Claims. (Cl. 178—23)

This invention relates to printing telegraph apparatus and particularly to the enabling and disabling operations of the various function mechanisms in a printing telegraph receiver.

In printing telegraph systems which include a plurality of stations, it is frequently desirable to have a number of stations receive the same message. At some of these stations, it may be preferable to have these messages printed on letter size sheets for facilitating the filing of the messages in folders, while at other stations, such as monitoring stations, it is only necessary to have the bodies of successive messages succeed one another on a continuous web of paper with a small space between succeeding messages. The operator sending the messages, of course, may transmit the signals for the intelligence portion of the message, and then transmit a plurality of "line feed" signals thus to provide any desired space for a message. All of the receiving stations will receive the same signals and normally, all stations would space the message exactly the same.

An object of the invention is to provide instrumentalities in receiving telegraph apparatus for rendering selected function mechanisms therein operative or inoperative in response to certain signals.

Another object of the invention is to provide a means responsive to the receipt of a specific signal a predetermined number of successive times to render the function mechanism which is normally responsive to the receipt of a said signal inoperable to further successive signals.

Still another object of the invention is to provide a mechanism for disabling a function mechanism of a printing telegraph recorder after the receipt of two or more successive signals which normally cause the operation of said mechanism and resetting said mechanisms to condition to respond to a signal calling for its operation upon the receipt of a signal calling for the operation of any other mechanism in the recorder.

More specifically it is an object of the present invention to provide some of the printing telegraph station apparatuses in a system, with mechanism responsive to the receipt of a plurality of "line feed" signals in succession, for rendering the line feed mechanism in such apparatuses inoperative after the receipt of two such signals and for restoring said line feed mechanisms to condition for subsequent operation upon the receipt of any signal other than a line feed signal.

In accordance with the preferred embodiment of this invention, the printing telegraph receiver into which the mechanism of the invention may be incorporated may be of the type disclosed in Patent No. 1,904,164, granted April 18, 1933 to S. Morton et al. and the disclosure of that patent is incorporated herein by reference as part of this specification.

The printing telegraph apparatus, disclosed in the aforementioned patent, is operated by various code combinations of impulse conditions and is mechanically and selectively controlled thereby. These impulse conditions are translated into mechanical operations and function by means of a selector mechanism designated 8 in said patent. Among other things, the selector mechanism designated 8 in said patent controls a plurality of vanes 36, 37, 38, 39, 40 and 50 and these vanes determine the selection of function levers for controlling such functions of the printer as carriage return, line feed, or shift and unshift.

In the herein disclosed embodiment of the present invention, mechanism is provided whereby, upon the receipt of signals calling for two line feed operations in succession, the line feeding mechanism of the apparatus will be rendered inoperative and insensitive to succeeding signals calling for line feed functions but, the apparatus will restore the line feeding mechanism to condition for subsequent operation upon the receipt of a signal calling for any other machine operation. In the specific mechanism disclosed herein, line feeding operations may be deleted or suppressed after two line feed operations have been effected. Thus while those stations of the system which are not equipped with the mechanism of the present invention will effectively receive the line feed signals that are sent out to all of the stations and will print the message transmitted and will feed paper to provide a suitably sized sheet of paper on which the message is printed, those pieces of apparatus in the system which are equipped with the mechanism of the present invention will print the messages on a continuous web and will only space the messages one from another by two regular spaces.

In the embodiment of the invention disclosed herein, the selector vanes control the operation of a line feed function lever and a line feed delete function lever upon the receipt in the apparatus of a signal calling for a line feed operation. The line feed function lever and line feed delete function lever in co-operation with the universal function lever, as disclosed in the Morton patent identified hereinbefore, co-operate to actuate a lever assemblage which is effective to block operation of the line feed function lever after the receipt of two signals calling for line feeding operations. Thus the line feed function of the printer is permitted to operate normally at the printer for the first two successive times and to be blocked from performing the function in response to any succeeding line feed signals.

A complete understanding of the invention can be obtained from the following description when read in conjunction with the drawings wherein.

Figure 1:
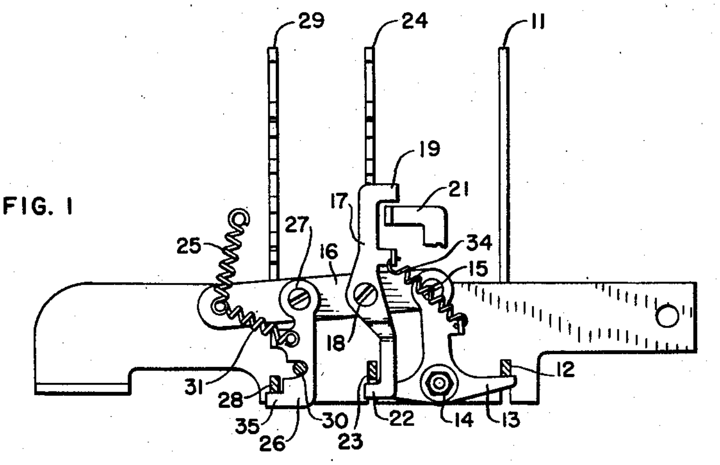
Fig. 1 is a front elevation of the apparatus herein disclosed.

In Fig. 1, there are shown a plurality of selector vanes 33 which are the equivalent of the selector vanes 36 to 40 and 50 shown in the Morton patent referred to hereinbefore. These vanes 33 are set to various positions, as described in said Morton patent, under control of a selector mechanism such as that diagrammatically illustrated herein at 32, which is the equivalent of the selector mechanism 8 of the Morton patent. The selector vanes 33 serve to control the selective operation of a line feed function lever 29 and a line feed delete function lever 24. These function levers 29 and 24 are pivotally mounted on a shaft 176 which is the same as the shaft 176 shown in said Morton patent. The oscillation of the function levers 29 and 24 is controlled by a function lever bail 165 in the same manner that the function bail lever 165 described in the Morton patent controls the function levers of that patent.

In the apparatus there is provided, in addition to the universal function lever 11 having a forward extension 12, a T-lever 13 pivoted at 14 and rotatably fastened to a reset lever 16 which is supported on one end by spring 25. An intermediate lever 17 is pivotally attached to the reset lever 16 at point 18 having its upper extremity 19 associated with a stop 21 and its lower extremity 22 adjacent to a forward extension 23 of the line feed delete function lever 24. A locking pawl 26 is pivotally fastened to the reset lever 16 at point 27 and so positioned as to be engageable with a forward extension 28 of the line feed function lever 29. The locking pawl 26 is urged toward the reset lever 16 by the spring 31.

Figure 2:
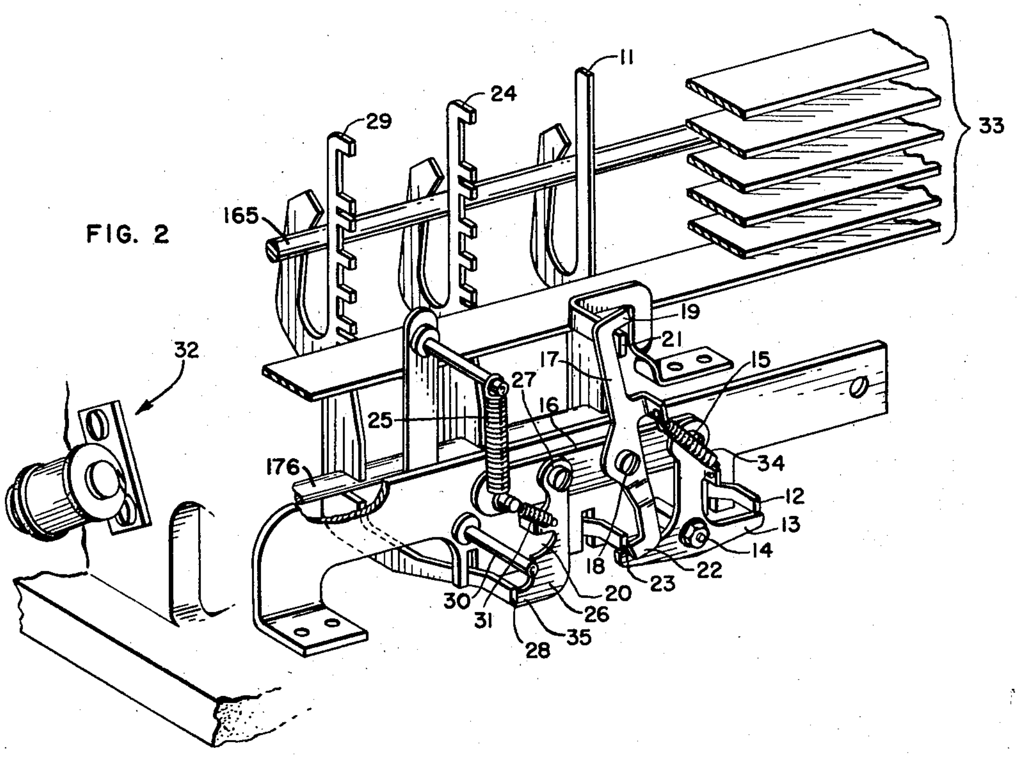
Fig. 2 is a perspective of the apparatus herein disclosed.

The T-lever 13 is positioned to be rotatable clockwise about its pivot point 14 by the forward extension 12 of the universal function lever 11, the lever 11 being moved on each printing or spacing operation of the printer. Rotation of the T-lever 13 causes its connecting pin 15 to be moved to the right (Figs. 1 and 2). Movement of the pin 15 causes the reset lever 16 to move to the right along with it. The reset lever 16 carries intermediate lever 17 with it and causes the upper extremity 19 to be blocked by the stop 21 so as to cause the intermediate lever 17 to rotate counterclockwise about its pivot 18. The T-lever 13 and its associated parts are held in this position by a spring washer (not shown) at its pivot point 14.

The line feed function lever 29 and the line feed delete function lever 24 are both adapted to be selected by the same signal and to move downward at the same time. The forward extension 23 of the line feed delete function lever 24 is positioned to contact the left shoulder of T-lever 13 or the lower extremity 22 of the intermediate lever 17 depending upon its position.

It is, of course, understood that only those portions of a printer such as that disclosed in the afore-mentioned Morton et al. patent are shown which are necessary to describe the present invention. The operation of the function levers is completely described in the Morton et al. patent. The selector mechanism symbolically indicated at 32 receives the signal and positions the vanes 33 to either block the function levers from being positioned to be actuated by the function bail (not shown) or permit them to be actuated by the function bail depending upon the cooperation of the cut out portion of the function lever and the vanes.

In the present invention the line feed function lever 29 and the line feed delete function lever 24 are identically coded so that both will be activated upon receipt of a line feed function signal. The universal function lever 11, like the universal function lever 490 of the Morton patent, has an actuator spring that is weaker than the actuator springs of other function levers. On each operation of the apparatus, the universal function lever 11 will attempt to restore T-lever 13 to the position shown in Fig. 2, but if the line feed delete function lever 24 is selected by the vanes 33, the T-lever 13 will be controlled by the line feed delete function lever 24.

In operation the universal function lever 11 is activated toward the vanes 33 causing its forward extension 12 to strike the right shoulder of T-lever 13 and thereby pivoting T-lever 13 clockwise about its pivot 14. As T-lever 13 pivots, pin 15 moves to the right and moves reset lever 16 to the right. Since the intermediate lever 17 is pivotally fastened to the reset lever 16 and the reset lever 16 moves to the right, the upper extremity 19 of the intermediate lever 17 is blocked by the stop 21 causing the lever 17 to rotate counterclockwise about its pivot pin 18 and move its lower extremity 22 out of the path of the forward extension 23 of the line feed delete function lever 24. The parts are retained in the position by a spring washer at the T-lever pivot point 14. The apparatus is now in the position illustrated in Fig. 2. A line feed signal received at the signal selector 32 positions the vanes 33 to activate both the line feed function lever 29 and the line feed delete function lever 24. As the delete function lever 24 moves toward the vanes 33 it contacts the left shoulder of the T-lever 13 causing the T-lever to be rotated counter-clockwise, thereby overcoming the attempt of the universal function lever 11 to move the T-lever 13 and moving the reset lever 16 and the intermediate lever 17 to the left. As the upper extremity of the lever 17 is moved away from the stop 21, the lever 17 is urged to rotate clockwise by a spring 34 thereby urging the lower extremity 22 of the lever 17 against the side of the forward extension 23 of the line feed delete function lever 24. At the same time the blocking pawl 26, being also pivotally attached to the reset lever 16, is moved against its stopping stud 30 and rotated counterclockwise about its pivot 27 against the tension of a spring 31. While the above described operation takes place, the line feed function lever 29 moves downward unobstructed to activate the line feed mechanism as is described in the afore-mentioned Morton et al. patent. At the end of the cycle the function levers are raised thereby permitting the lower extremity 22 of the intermediate lever 17 to move beneath the extension 23 of the function delete lever 24. A subsequent function signal will move extension 28 of the function lever 29 downward to perform its assigned function and simultaneously will move the forward extension 23 of the function delete lever 24 to contact the lower extremity 22 of the intermediate lever 17 and move the lever 17 downward thereby causing the reset lever 16 to rotate counterclockwise about its pin 15 against the force of the spring 25. The rotation of the reset bar 16 causes the blocking pawl 26 to be positioned with its cut out portion 20 opposite the stopping stud 30 and its lower portion is allowed to be rotated against the side of the forward extension 28 of function lever 29. At the end of the cycle the function lever 29 and the function delete lever 24 move upward allowing the jaw 35 of the blocking pawl 26 to move under the extension 28 of the function lever 29 and thereby prevent the operation of that function lever by any succeeding line feed function signal. The device is now in the position illustrated in Fig. 1.

When a printed character or a space is selected, the forward extension 12 of the universal function lever strikes the right shoulder of the T-lever 13 to rotate the lever 13 clockwise about its pivot 14 thereby moving the intermediate lever 17, the reset lever 16 and the blocking pawl 26 to the right. As the afore-mentioned parts move to the right they unblock the function levers 29 and 24 and permit the left end of the reset lever 16 to be raised by the spring 25.

While the line feed function has been referred to as the function effected by this invention, it is apparent that the invention is not limited to the line feed function and could be applied to any of the functions of a printing telegraph apparatus of the type herein disclosed.

What is claimed is:

1. In a telegraph recording device, a function lever, a signal responsive selector mechanism for selecting the various elements of the device for actuation and responding to a preconcerted signal to select said function lever for actuation, a second lever also selected for actuation by said signal responsive mechanism when said mechanism receives said preconcerted signal, means operable to actuate said levers upon their being selected, and means controlled by a predetermined number of successive actuations of said second lever to block said function lever against actuation.

2. In a telegraph recorder of the type described, a function lever, a signal responsive selector mechanism for selecting various elements of the device for actuation and operable to select said function lever upon receipt in said mechanism of a function signal allocated to said function lever, means operable to actuate the various elements of the device upon their selection for operation by said mechanism, means to block said function lever against actuation, a second lever also selected for actuation by said mechanism upon receipt in said mechanism of said function signal, and means actuated by a predetermined number of successive actuations of said second lever to actuate said blocking means.

3. A function deleting device in a telegraph recorder which recorder includes a signal responsive selector mechanism for selecting various elements of the recorder for actuation and means operable to actuate the selected elements, comprising a function lever arranged to be selected for actuation by said selector mechanism upon receipt in said mechanism of a predetermined signal, a delete element selected for actuation each time said function lever is selected for actuation, means actuated by a predetermined number of successive actuations of said delete element to block said function lever against actuation, and means normally operable in each cycle of operation to restore said blocking means to unactuated condition if said blocking means had been actuated, said last-mentioned means being rendered ineffective to unblock the function lever by the delete element when the delete element is actuated for unblocking said function lever.

4. In a telegraph recorder including a function lever, a signal responsive selector mechanism for selecting various elements of the recorder for actuation and operable upon receipt of a predetermined signal to select said function lever for actuation, means for actuating any element of the recorder which has been selected by said mechanism, blocking means movable in a predetermined number of incremental steps into position to block said function lever from further operation, and a lever selected for actuation each time the function lever is selected and actuated by said actuating means to move said blocking means one step on each of a predetermined number of actuations of said lever selected with the function lever, whereby said function lever is blocked from further operation after the receipt of a predetermined number of successive function signals by said selector mechanism.

5. A device responsive to two successive predetermined, identical function signals in a telegraph recorder to prevent further operation of the function mechanism which normally responds to said predetermined signal comprising a function lever, means including a selector mechanism responsive to a function signal to activate said function lever, a pivotally mounted interponent, means operable under control of said selector mechanism upon receipt by said mechanism of said predetermined signal to rotate said interponent, a reset lever, means conditioned by the rotation of said interponent and actuated by the means which rotated the interponent upon operation of said interponent rotating means for rotating said reset lever, and means actuated by the rotation of said reset lever to block the function lever from further operation.

6. In a telegraph recorder having a first function lever, means including a signal responsive selector mechanism operable upon receipt of a predetermined signal to actuate said first function lever, a pivotally mounted interponent having a neutral position and an operated position, a second function lever actuated by said means upon receipt of said predetermined signal to rotate said interponent from its neutral position to its operated position, a reset lever pivotally mounted on said interponent, means conditioned by the rotation of said interponent to its operated position to rotate said reset lever in response to a second actuation of said second function lever, means conditioned by the rotation of said reset lever to block said first function lever from further operation whereby the receipt of two successive ones of said predetermined signal operates the associated function lever and then blocks further operation of the function lever, and means responsive to the receipt by the selector mechanism of any signal other than said predetermined signal to reset the pivotal interponent to its neutral position.

7. In a telegraph recorder, a signal responsive selector mechanism, a first function lever selectable by said selector mechanism in response to receipt in said mechanism of a predetermined signal, a second function lever selectable by said selector mechanism in response to receipt in said mechanism of said predetermined signal, means operable in each cycle of operation of the recorder for operating the selected function levers, a T-lever mounted for rotation through a predetermined arc from a home position by the operation of said second function lever, a reset lever conditioned by the rotation of said T-lever from its home position to be rotated by the operation of said second function lever, a blocking pawl conditioned by the rotation of said reset lever for blocking subsequent operation of said first function lever, and a universal function lever having an extension engageable with said T-lever and urged to operate in each cycle of the recorder in which said predetermined signal is received for returning said T-lever to its home position unless said T-lever is actuated by said second function lever whereby normal operation of the first function lever is automatically blocked after the receipt of the second of three or more successive predetermined signals in the selector mechanism and the blocking means is rendered ineffective upon receipt in the selector mechanism of a signal other than that representing the function.

References Cited in the file of this patent

UNITED STATES PATENTS

| | | |
|---|---|---|
| 2,590,421 | Lanza | Mar. 25, 1952 |
| 2,615,980 | Salmon | Oct. 28, 1952 |